United States Patent
Satake et al.

(10) Patent No.: US 9,545,889 B2
(45) Date of Patent: Jan. 17, 2017

(54) POWER SUPPLY UNIT

(71) Applicant: YAZAKI CORPORATION, Tokyo (JP)

(72) Inventors: Shuuji Satake, Shizuoka (JP); Akiyoshi Kanazawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 461 days.

(21) Appl. No.: 14/177,701

(22) Filed: Feb. 11, 2014

(65) Prior Publication Data

US 2014/0159482 A1    Jun. 12, 2014

Related U.S. Application Data

(63) Continuation of application No. PCT/JP2012/006797, filed on Aug. 3, 2012.

(30) Foreign Application Priority Data

Aug. 11, 2011  (JP) ................. 2011-175840

(51) Int. Cl.
*B60R 16/033* (2006.01)
*H02J 7/14* (2006.01)
(Continued)

(52) U.S. Cl.
CPC ............... *B60R 16/033* (2013.01); *H02J 1/00* (2013.01); *H02J 7/14* (2013.01); *B60Q 1/0094* (2013.01); *Y10T 307/25* (2015.04)

(58) Field of Classification Search
CPC .... Y10T 307/461; B60R 16/03; B60R 16/033; B60Q 1/0094; H20J 1/00
See application file for complete search history.

(56) References Cited

U.S. PATENT DOCUMENTS 5,637,933 A * 6/1997 Rawlings ............ H02J 13/0062
                                                    307/147
6,144,110 A * 11/2000 Matsuda ................... H02J 9/04
                                                    307/10.1

(Continued)

FOREIGN PATENT DOCUMENTS

EP    0 051 849 A1    5/1982
EP    1 414 048 A1    4/2004

(Continued)

OTHER PUBLICATIONS

The extended European search report for the related European Patent Application No. 12822736.0 dated Oct. 23, 2015.

(Continued)

*Primary Examiner* — Jeffrey Shin
(74) *Attorney, Agent, or Firm* — Kenealy Vaidya LLP (57) ABSTRACT

Disclosed is a power supply unit reducing deterioration of power loss caused by cables. A connector connecting a power line L11 connected to a battery and a plurality of ramp loads is attached to a holder housing at least one of the plurality of ramp loads. The connector is provided with: a pressure-bonding power source terminal to which the power line L11 is connected and power is inputted, a first branch circuit branching one power line inputted from the pressure-bonding terminal into a plurality of branch lines, a plurality of tub-like power source terminal, pressure-bonding power terminals each connected to the plurality of branch lines branched by the first branch circuit and outputting power to each ramp load; and a housing housing them.

6 Claims, 9 Drawing Sheets

(51) Int. Cl.
*H02J 1/00* (2006.01)
*B60Q 1/00* (2006.01)

(56) References Cited

U.S. PATENT DOCUMENTS

| | | | |
|---|---|---|---|
| 6,768,647 B1 | 7/2004 | Kowtun et al. | |
| 7,265,457 B2 * | 9/2007 | Yasui | H02J 1/00 307/10.7 |
| 2002/0084786 A1 * | 7/2002 | Egami | B60Q 11/00 324/503 |
| 2003/0095036 A1 | 5/2003 | Wasaki et al. | |
| 2006/0287775 A1 * | 12/2006 | Bechtold | B60R 16/03 701/1 |
| 2008/0299819 A1 | 12/2008 | Kakutani | |

FOREIGN PATENT DOCUMENTS

| | | |
|---|---|---|
| EP | 2 172 371 A1 | 4/2010 |
| GB | 2 329 082 A | 3/1999 |
| JP | 54-159934 A | 12/1979 |
| JP | 2003-212065 A | 7/2003 |
| JP | 2003-218754 A | 7/2003 |
| JP | 2004-259582 A | 9/2004 |
| JP | 2008-298536 A | 12/2008 |
| JP | 2010-36646 A | 2/2010 |

OTHER PUBLICATIONS

Japanese Office Action for the related Japanese Patent Application No. 2011-175840 dated Sep. 8, 2015.
International Search Report and Written Opinion of the International Search Report for PCT/JP2012/069797 dated Sep. 11, 2012.
European Office Action for the related European Patent Application No. 12 822 736.0 dated Aug. 8, 2016.

* cited by examiner

POWER SUPPLY UNIT

TECHNICAL FIELD

This invention relates to power supply units, particularly to power supply units including batteries and a plurality of loads receiving power from the batteries.

BACKGROUND ART

Figure 14:
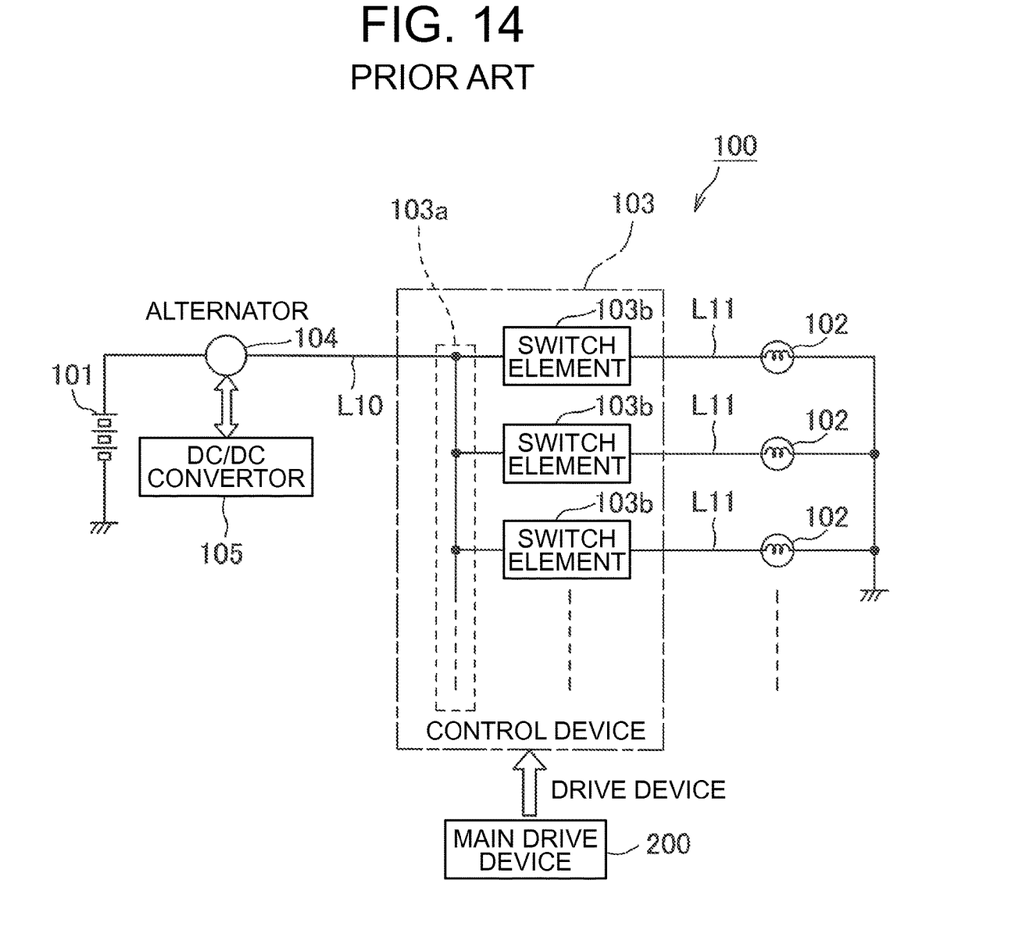
FIG. 14 is a schematic diagram illustrating one embodiment of a conventional power supply unit.

Such a vehicle as an automobile has a power supply unit mounted therein for supplying power to a plurality of loads. Well known as this power supply unit is, for example, what is illustrated in FIG. 14. As shown in the figure, the power supply unit 100 is provided with a battery 101, ramp loads 102 as a plurality of loads, and a controller 103 disposed between the battery 101 and the plurality of ramps 102.

The aforementioned controller 103 is mounted to, for example, a power supply box disposed near the battery 101. This controller 103 incorporates a branch circuit 103a branching a power line form the battery 101 into a plurality of branch lines, and a plurality of switch elements 103b each disposed on the branch lines branched by the branch circuit 103a. A Mechanical relay or transistor relay is used as the switch elements 103b. The switch elements 103b is controlled to switch on or off by supplying a drive signal from a main drive device 200.

According to the power supply unit 100 shown in FIG. 14, to switch on the switch elements 103b by the main drive device 200 allows power from the battery 101 to be supplied to the ramp loads 102, and to switch off the switch elements 103b by the main drive device 200 allows power supplied from the battery 101 to the ramp loads 102 to be shut down.

The automobile, in order to charge the battery 101, also has alternate 104 mounted thereto as a generator transforming mechanical energy of an engine into an electric energy. In order to supply power this alternate 104 generates directly to the ramp loads 102, this alternate 104 may be disposed between the battery 101 and the ramp loads 102. For example, with the battery 101 in 48V-system and with the ramp loads 102 in 12V-system, a DC/DC convertor 105 may be disposed between the battery 101 and the ramp loads 102 that steps down the power voltage from the battery 101.

A cable L01 that connects between the battery 101 and the controller 103 is required to apply large current to which currents applied to the plurality of ramp loads 102 total up, and thus is applied for the one in which its cable size is large and pathway resistance is small. On the other hand, the cable L11 connecting the controller 103 and each ramp load 102 may apply current only applied to ramp loads 102 to be connected, and thus is applied for the one in which its cable size is small and pathway resistance is large.

Therefore, mounting the aforementioned controller 103 in the power supply box near the battery 101 induces the cable L11 with larger pathway resistance than the cable L10 with small pathway resistance to become long, increasing voltage drop caused by the cable L11. Therefore, drawbacks were posed that power loss caused by the cable L11 becomes large and thus voltage applying to the ramp loads 102 becomes low.

Furthermore, the aforementioned ramp loads 102 is regulated in its rated voltage, and when voltage beyond the rated voltage is applied, power the ramp loads 102 consume increases so as to become bright beyond necessity. It follows from this that applying voltage beyond the rated voltage to the ramp loads 102 results in applying useless voltage. Furthermore, the higher the voltage applied to the ramp loads 102, the more electrical stress applied to the ramp loads 102, possibly deteriorating product life (it is exactly well known that the ramp loads 102 such as filament when beyond the rated voltage becomes short in their product life).

Then, it is thought that voltage outputted from the alternate 104 or DC/DC convertor 105 is dropped to the rated voltage of the ramp loads 102 so as to become unwasted. The voltage, however, cannot be dropped to the rated voltage outputted from the alternator 104. This is attributed to the fact that in the automobile power is regenerated for improvement of fuel efficiency in which the battery 101 is charged by the alternator 104. In this power regeneration, for example, with the voltage of the battery 101 in 12 volt, it is required that the voltage outputted from such the alternator 104 is set to 14 volt higher than 12 volt. Some automobile may also output voltage higher than 14 volt. Therefore, dropping the voltage outputted from such the alternator 104 to the rated voltage disenables to charge the battery 101.

SUMMARY OF INVENTION

Technical Problem

The object of the invention is to provide a power supply unit capable of reducing deterioration of power loss caused by cable.

Solution to Problem

The invention according to one aspect in order to resolve the problems mentioned above is related to a power supply unit including a power source and a plurality of loads receiving power from the power source, the power supply unit including: a branching circuit branching one power line connected to the power source into a plurality of branch lines for providing the plurality of loads with power source line, the branching circuit being located adjacent to the loads.

Preferably, the power supply unit further includes a connector including a first terminal fitting connected to the power source, a plurality of second terminal fittings each connected to the loads, and a connector housing the first terminal fitting and the second terminal fittings, wherein the branching circuit is, with the branching circuit in connection with the first terminal fitting and the second terminal fittings, housed in the connector housing.

Preferably, the branching circuit is attached to a case housing at least one of the plurality of loads.

Preferably, the branching circuit is located nearer to the plurality of loads than a middle among the power source and the plurality of loads.

Preferably, the power supply unit further includes a plurality of cables connecting the branching circuit and the plurality of loads, wherein the branching circuit is located where a total cable length of the plurality of cables becomes minimum within a range of possibly wiring the cables.

Preferably, the power supply unit further includes a plurality of cables connecting the branching circuit and the plurality of loads, wherein the branching circuit is located where a total power loss of the plurality of cables becomes minimum within a range of possibly wiring the cables.

Preferably, the power supply unit further includes a plurality of cables connecting the branching circuit and the plurality of loads, wherein the branching circuit is located where a total cable weight of the plurality of cables becomes minimum within a range of possibly wiring the cables.

Preferably, the connector housing further houses a plurality of switching elements each disposed on the branch lines, a voltage detector detecting a supply voltage supplied to each of the loads inputted from the first terminal fitting, and an on/off controller intermittently switching on the switch elements and decreasing a duty ratio of an on-period of the switching elements as the supply voltage detected by the voltage detector rises.

ADVANTAGEOUS EFFECTS OF INVENTION

According to the invention, since the branch circuit is located adjacent to the plurality of loads, it is made possible that the cable with large size and small pathway resistance between the power supply and the branch is enabled to be long, and the cable with small size and large pathway resistance between the branch and each load short, reducing deterioration of power loss caused by the cable.

According to the invention, since the branching circuit is housed in the connector housing, it is made possible to readily be attached to the power supply unit.

According to the invention, since the on/off controller intermittently switches on the switch elements and decreases the duty ratio of the on-period of the switch elements as the supply voltage detected by the voltage detector increases. Namely, the higher the supply voltage, the shorter the on-period of the switch elements, thus allowing power to be controlled in constant. This makes no useless power beyond certain level supplied, saving power and lengthening product life. Furthermore, enabling possibly shortening pathway between the connector and each load allows the supply voltage to be supplied to the loads to be accurately detected.

DESCRIPTION OF EMBODIMENTS

First Embodiment

Figure 1A:
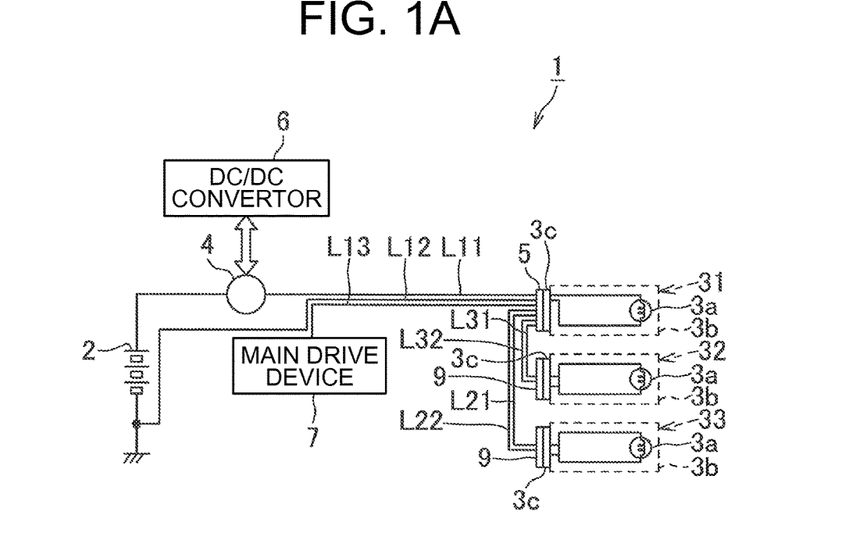
FIG. 1A is a schematic diagram illustrating a first embodiment of a power supply unit of the invention.

Hereinafter, with reference to drawings a power supply unit of the present invention is discussed. This power supply unit 1 is the one that is mounted to an ICEC (Internal Combustion Engine Vehicle). As shown in FIG. 1, the power supply unit 1 is provided with a battery 2 as a power source, a plurality of loads 31 to 33 receiving power supply from such the battery 2 to operate, an alternator 4 disposed between the battery 2 and the plurality of loads 31 to 33, a connector 5 connecting a power line L11 connected to the battery 2, ground line L12, and the plurality of loads 31 to 33.

The aforementioned battery 2 uses what is called a secondary battery such as a lead battery or lithium battery, and is arranged within, e.g., an engine room in the vehicle. The plurality of loads units 31 to 33 is each provided with a ramp load 3a, a holder 3b holding and housing the ramp load 3a, and a connector 3c disposed integral with the holder 3b. These load units 31 to 33 are arranged near to each other in the vehicle. The aforementioned connector 3c is composed of, e.g., a not-shown male and female terminal fitting connected to both ends of the ramp load 3a, and a housing disposed integral with the holder 3b holding these terminal fittings.

The alternator 4 is a generator that transforms mechanical energy from an engine into an electric energy, charging the battery 2 or supplying directly power to the aforementioned ramp load 3a. While instead of this alternator 4, DC/DC convertor 6 may be connected between the battery 2 and the plurality of load units 31 to 33 that steps down the supply voltage from the battery 2, the alternator 4 is herein described.

The aforementioned connector 5 is connected and mounted to the connector 3c of the one load unit 31 among the plurality of load units 31 to 33. This load unit 31 is provided with the ramp load 3a of which consumption current is the largest among the ramp loads 3a disposed to the load units 31 to 33. This connector 5 initiates according to an output of a drive signal from a main drive device 7 supplying power to the ramp load 3a incorporated into the plurality of load units 31 to 33, and blocks according to stop of the output of the drive signal supplying power to the ramp load 3a.

Figure 1B:
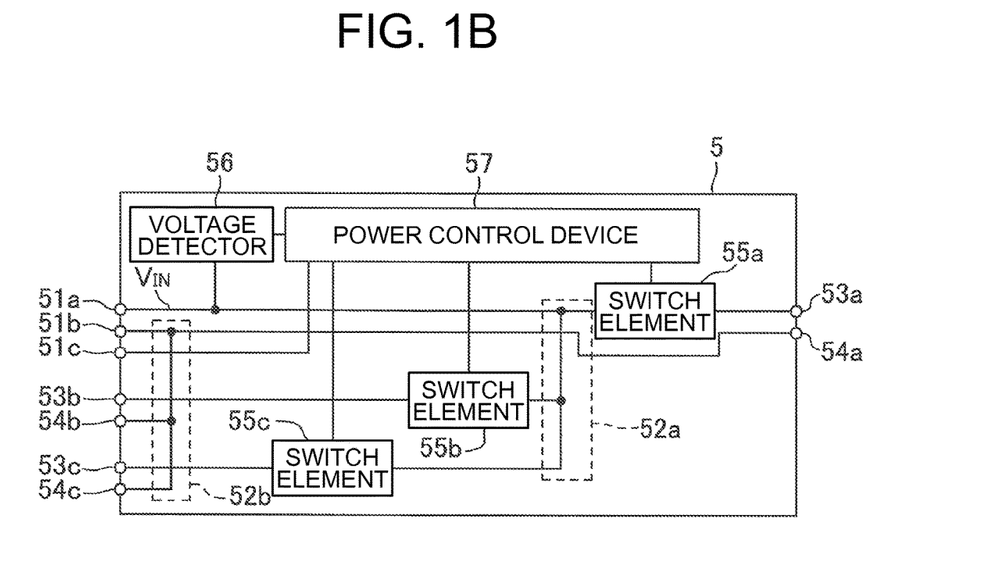
FIG. 1B is a detailed schematic diagram illustrating a connector shown in FIG. 1A.

This connector 5 is, as shown in FIG. 1B, provided with a pressure-bonding power source terminal $51a$, a pressure-bonding ground terminal $51b$, a pressure-bonding terminal $51c$, a first branch circuit $52a$, a second branch circuit $52b$, a tub-like power source terminal $53a$, a pressure-bonding power source terminals $53b$, $53c$, a tub-like ground terminal $54a$, and pressure-bonding ground terminals $54b$, $54c$. The pressure-bonding power source terminal $51a$ as the aforementioned first terminal fitting has the power source line L11 connected to a positive of the battery 2, connected thereto and a positive from the battery 2 is inputted.

The pressure-bonding ground terminal $51b$ has the ground line L12 connected to a negative of the battery 2 connected and a negative from the battery 2 is inputted. The pressure-bonding signal terminal 51c has a signal line L13 connected to the main drive device 7, connected thereto and a drive signal is inputted. The first branch circuit 52a as the branch circuit is a circuit that branches one power source line inputted from the pressure-bonding power source terminal 51a into a plurality of branch lines. The aforementioned second branch circuit 52b is a circuit that branches one ground line inputted from the pressure-bonding ground terminal 51b into a plurality of branch lines.

The tub-like power source terminal 53a, the pressure-bonding power source terminals 53b, 53c as the second terminal fittings are each connected to the plurality of branch lines branched by the first branch circuit 52a, and output the positive of the power source to each ramp loads 3a. The tub-like power source terminal 53a, the pressure-bonding power source terminals 53b, 53c are terminals that are each connected to the plurality of branch lines branched by the second branch circuit 52b, and output negative of the power source to each ramp load 3a.

The aforementioned connector 5 is also provided with switch elements 55a to 55c each disposed on the branch line branched by the first branch circuit 52a, a voltage detector 56 detecting the input voltage $V_{IN}$ inputted from the pressure-bonding power source terminal 51a as power supply voltage supplied to the ramp load 3a disposed to each load units 31 to 33, and a power control device 57 as an on/off control means controlling on/off of the switch elements 55a to 55c in accordance with detecting result of the drive signal and the voltage detection device 56.

The aforementioned switch elements 55a to 55c are made of, for example, semiconductor relay, when powered on, supplies power from the alternator 4 to the ramp load 3a, and when powered off, blocks power supply from the alternator 4 to the ramp load 3a.

The aforementioned voltage detector 56 is made of, e.g., operational amplifier or the like, supplying a detected voltage to the power control device 57. The aforementioned power control device 57 is composed of, e.g., a known microprocessor or the like, managing wholly the power supply unit 1. These voltage detector 56 and the power control device 57 are those that receive power from the battery 2 through the pressure-bonding power source terminal 51a and the ground terminal 51b to operate.

Figure 2A:
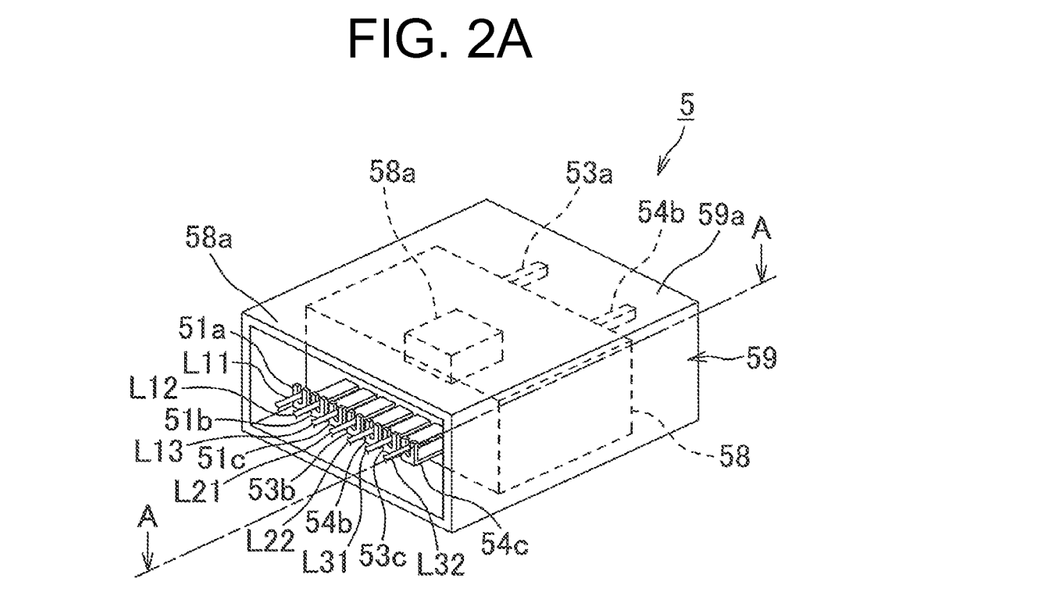
FIG. 2A is a perspective appearance view illustrating an outline of the connector shown in FIG. 1B.
Figure 2B:
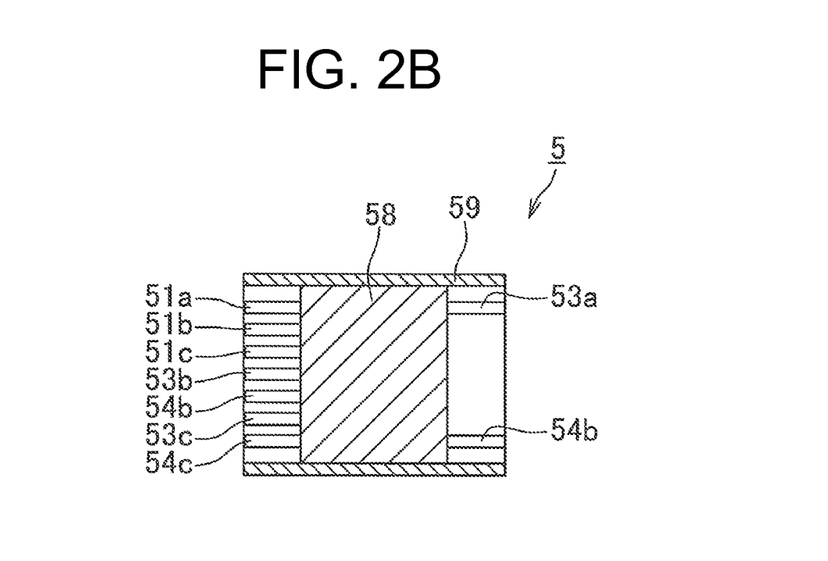
FIG. 2B is a cross-sectional view taken along A-A line in the FIG. 2A.

The aforementioned connector 5 is also provided with a sealing body 58 where these terminals 51a to 51c, 53a to 53c, and 54a to 54c project, a housing 59 housing these terminals 51a to 51c, 53a to 53c, and 54a to 54c, and the sealing body 58.

Then, prior to describing the aforementioned sealing body 58 and the housing 59, a configuration of these terminals 51a to 51c, 53a to 53c, and 54a to 54c projecting from the sealing body 58 is discussed. The aforementioned pressure-bonding power source terminal 51a, the pressure-bonding ground terminal 51b, the pressure-bonding signal terminal 51c, the pressure-bonding power source terminals 53b, 53c, and the pressure-bonding ground terminals 54b, 54c are mode of conductive metal, one end of which is each inserted into the sealing body 58 to be mentioned below, the other end of which each projects from one face of a pair of opposite faces of the sealing body 58.

These pressure-bonding power source terminal 51a, the pressure-bonding ground terminal 51b, the pressure-bonding signal terminal 51c, the pressure-bonding power source terminals 53b, 53c, and the pressure-bonding ground terminals 54b, 54c have pressure-bonding blade formed at the other end thereof. And the pressure-bonding power source terminal 51a has a terminal of the power source line L11 pressure bonded, the pressure-bonding ground terminal 51b a terminal of the ground line L12, and the pressure-bonding signal terminal 51c a terminal of the signal line L13. Furthermore, the pressure-bonding power source terminal 53b, the pressure-bonding ground terminal 54b have one end of the power line L21 and one end of the ground line L22 connected to the load unit 33 as the power line pressure bonded. The pressure-bonding power source terminal 53c, the pressure-bonding ground terminal 54c have one end of the power line L31 and one end of the ground line L32 connected to the load unit 32 as the power line pressure bonded.

Note that as shown in FIG. 1A the other ends of the aforementioned power source line L21 and the ground line L22 have the connector 9 attached thereto, which the connector 9 is connected to the connector 3c of the load unit 33. Then, when the connector 9 and the load unit 33 are connected, the power source L21 and the ground line L22 are connected to both ends of the ramp load 3a of the load unit 33.

The other ends of the aforementioned power source line L31 and the ground line L32 also have the connector 9 attached thereto, which the connector 9 is connected to the connector 3c of the load unit 32. Then, when the connector 9 and the connector 3c of the load unit 32 are connected, the power source L31 and the ground line L32 are connected to both ends of the ramp load 3a of the load unit 32.

The aforementioned tub-like power source terminal 53a and the tub-like ground terminal 54a are made of conductive metal, one ends of which are inserted into the sealing body 58 to be mentioned below, the other ends of which each project from the other face of the pair of opposite faces of the sealing body 58. The other ends of the tub-like power source terminal 53a and the tub-like ground terminal 54a are formed into a tub-like shape, and are engaged with the female terminal fitting disposed to the connector 3c of the load unit 31.

The sealing body 58 and the housing 59 are then discussed. The sealing body 58 seals with resin the aforementioned first branch circuit 52a, the second branch circuit 52b, the switch elements 55a to 55c, chip 58a having the voltage detector 56 and the power control device 57 mounted thereto, these terminals 51a to 51c, 53a to 53c, and 54a to 54c with their wire-bonded are sealed with resin.

The aforementioned housing 59 houses these terminals 51a to 51c, 53a to 53c, and 54a to 54c, and the sealing body 58. The housing 59 is formed into a flattened square shape, and from an opening of one of the housing 59 the pressure-bonding power source terminal 51a, the pressure-bonding ground terminal 51b, the pressure-bonding signal terminal 51c, the pressure-bonding power source terminals 53b, 53c, and the pressure-bonding ground terminals 54b, 54c are exposed, from an opening of the other the tub-like power source terminal 53a and the tub-like ground terminal 54a are exposed. The other side of the housing 59 in a tubular length direction is provided with a hood 59a into which a housing for the connector 3c disposed to the load unit 31 is inserted to engage. The housing for the connector 3c disposed to the load unit 31 enters into the hood 59a, and thereby the terminal fitting of the connector 3c is connected to the tub-like power source terminal 53a and the tub-like ground terminal 54a.

Figure 3:
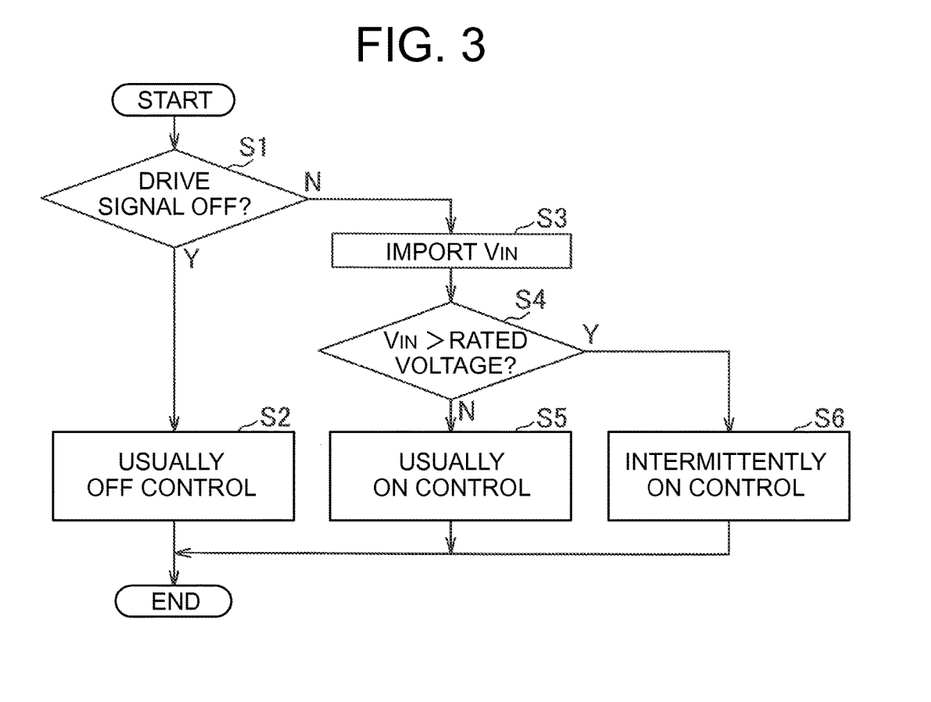
FIG. 3 is a flow chart illustrating power control device composing the power supply unit shown in FIG. 1.
Figure 4:
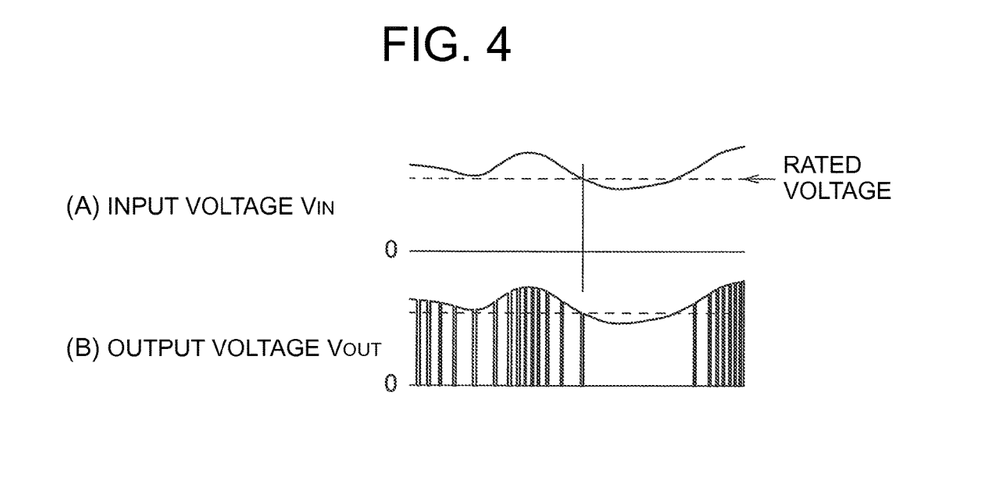
FIG. 4 is a time chart, wherein (A) illustrates an input voltage $V_{IN}$ inputted from a pressure-bonding terminal $51a$ of a connector composing the power supply unit shown in FIG. 1, and (B) illustrates a time chart of an output voltage $V_{OUT}$ outputted from a tub-like power source terminal $53a$, a pressure-bonding terminals $53b$, $53c$ composing the power supply unit 1 shown in FIG. 4B.

With reference now to FIGS. 3 and 4 an operation of the power supply unit 1 configured as mentioned above is discussed. FIG. 3 illustrates a flow chart of the power control device 57 composing the power supply unit 1 shown in FIG.

1. FIG. 4 illustrates a time chart, of which (A) illustrates the input voltage $V_{IN}$ inputted from the pressure-bonding power source terminal 51a of the connector 5 composing the power supply unit 1 shown in FIG. 1 and of which (B) a time chart of the input voltage $V_{OUT}$ outputted from the tub-like power source terminal 53a, the pressure-bonding power source terminals 51b, 53c composing the power supply unit 1 shown in FIG. 1.

The power control device 57 also starts operation in accordance with the drive signal from the main drive device 7. Firstly, the power control device 57 determines whether the drive signal from the main drive device 7 is switched off or not (step S1) as shown in FIG. 3. If switched off (Y in step S1), the power control device 57 stops outputting control signal to the switch elements 55a to 55a (step S2), before terminating. If not switched off (N in step S1), the power control device 57 otherwise goes to step S3.

In step S3, the power control device 57 imports the input voltage $V_{IN}$ detected by the voltage detector device 56. Then, the power control device 57 determines whether the voltage $V_{IN}$ imported in step S3 exceeds rated voltage (predetermined value) of the ramp load 3a preliminarily determined (step S4).

If the input voltage $V_{IN}$ does not exceed the rated voltage (N in step S4), the power control device 57 outputs control signal to usually switch on the switch elements 55a to 55c before terminating.

To the contrary, if the input voltage $V_{IN}$ exceeds the rated voltage (Y in step S4), the power control device 57 otherwise outputs control signal to intermittently but not usually switch on the switch elements 55a to 55c (step S6) before terminating. In step S6, the power control device 57 decreases duty ratio of on-period of the switch elements 55a to 55c as the input voltage $V_{IN}$ rises. Herein, by the duty ratio of on-period is meant a ratio of on-period of the switch elements 55a to 55c divided by a cycle time of the switch elements 55a to 55c being switched on.

According to the aforementioned operation, as shown in FIG. 4, power is usually supplied to the ramp load 3a while the input voltage $V_{IN}$ does not exceed the rated voltage, and is intermittently supplied to the ramp load 3a while the input voltage $V_{IN}$ exceeds the rated voltage. The duty ratio of on-period, at this time, decreases as the input voltage $V_{IN}$ rises.

Figure 5:
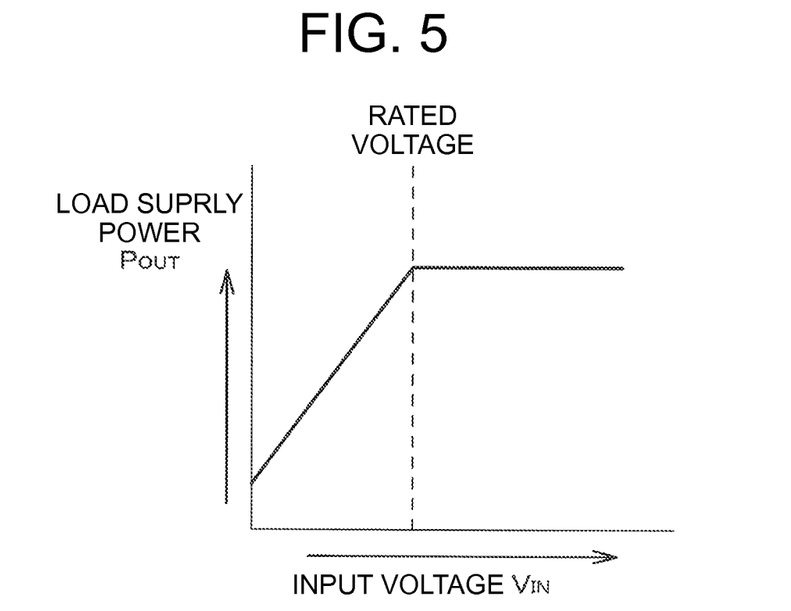
FIG. 5 is a chart illustrating a power supplied to a ramp power to an input voltage to the connector.

Therefore, the input voltage $V_{IN}$ bears a relationship with the power $P_{OUT}$ supplied to the ramp load 3a as shown in FIG. 5. Namely, while the input voltage $V_{IN}$ does not exceed the rated voltage, the switch elements 55a to 55c is controlled to be usually switched on by the power control device 57, resulting in power increasing as the input voltage $V_{IN}$ increase. When the input voltage $V_{IN}$ exceeds the rated voltage, the switch elements 55a to 55c is controlled to be intermittently switched on by the power control device 57, and on-period decreases as the input voltage $V_{IN}$ rises, making it possible to keep the power $P_{OUT}$ in constant.

According to the aforementioned power supply unit 1, attaching the connector 5 integrating therein the circuit 52a to the holder 3b housing the plurality of ramp loads 3a, makes it possible to lengthen the power source line L11 that is thick and small pathway resistance between the battery 2 and the connector 5, and shorten the pathway that is thin and high pathway resistance to the ramp loads 3a disposed between the connector 5 and the load unit 31. Furthermore, since the load units 31 to 33 are arranged adjacent to each other, it is made possible to lengthen the power source lines L21, L31 that is thick and small pathway resistance to the ramp loads 3a disposed between the connector 5 and the load unit 32, 33. This makes possible reduction of power loss by the cables.

According to the aforementioned power supply unit 1, since the connector 5 is attached to the load unit 3a integrating the ramp load 3a of which consumption current is the largest, it is made possible to further reduce power loss.

Furthermore, according to the aforementioned power supply unit 1, since the branch circuit 51a is integrated into the connector 5, it is made possible to be readily attached to the power supply unit 1.

Furthermore, according to the aforementioned power supply unit 1, since the power control device 57 controls to intermittently switch on the switch elements 55a to 55c and to decrease the duty ratio of on-period of the switch elements 55a to 55c as the input voltage $V_{IN}$ detected by the voltage detector 56 rises. Namely, the larger the input voltage $V_{IN}$, the shorter the on-period of the switch elements 55a to 55c, making it possible to keep the power in constant. This attends not supplying useless power exceeding a certain level, making possible power saving and longer operating life. In addition, since as mentioned above it is made possible to possibly shorten pathway between the connector 5 and each ramp load 3a, it is made possible accurate detection for supply voltage supplied to the ramp load 3a.

Furthermore, according to the aforementioned connector 5, since the power control device 57 controls to usually switch on the switch elements 55a to 55c while the input voltage $V_{IN}$ detected by the voltage detector 56 does not exceed the rated voltage, and controls to intermittently switch on the switch elements 55a to 55c while the input voltage $V_{IN}$ exceeds the rated voltage, it is made possible fulfilling function of the ramp load 3a.

Furthermore, according to the aforementioned connector 5, the alternator 4 or DC/DC convertor 6 connected in parallel to the battery 2 is further provided, and the switch elements 55a to 55c are disposed nearer to the ramp load 3a than the alternator 4 or DC/DC convertor 6. Therefore, with the alternator 4, reduction of engine load makes possible for power saving to improve by reduction of power generation torque of the alternator 4, contributing to reduction of consumption fuel. With the DC/DC convertor 6, reduction of the output voltage makes possible reduction of a consumption of battery 2.

Note that according to the aforementioned embodiment, while the ground voltage inputted from the pressure-bonding terminal 51b is branched to output from the tub-like ground terminal 54a and the pressure-bonding terminals 54b, 54c to be supplied to each ramp load 3a, the invention is not limited to this embodiment. For example, if the ground voltage is supplied to the ramp load 3a via another route, the second branch circuit 52b, the tub-like ground terminal 54a, the pressure-bonding ground terminals 54a, 54c may not be provided. If the ground voltage is supplied to the ramp load 3a via another route, while omitting the pressure-bonding ground terminal 51b, and leaving any one of the pressure-bonding ground terminals 54a and the pressure-bonding ground terminals 54b, 54c, the ground voltage may be inputted from one of the plurality of ramp loads 3a.

Second Embodiment

Figure 6:
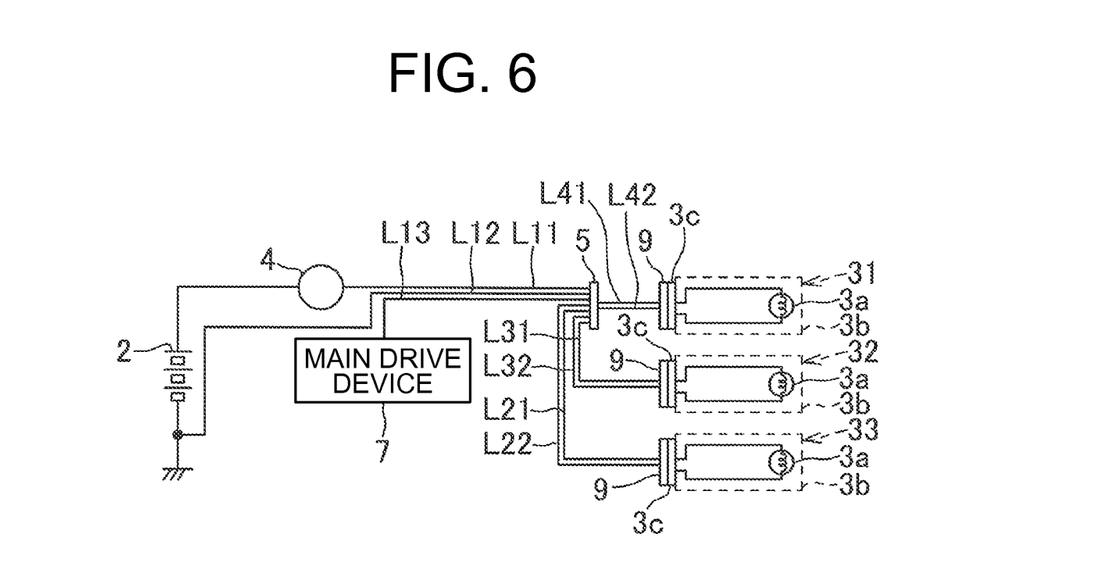
FIG. 6 is a schematic diagram illustrating a second embodiment of the power supply unit of the invention.

Note that while in the aforementioned first embodiment attaching the connector 5 to the holder 3b of the load unit 31 makes the connector 5 arranged adjacent to the plurality of ramp loads 3a, the invention is not limited to this configuration, the aforementioned connector 5 may be arranged nearer to the plurality of ramp loads 3a than the middle between the battery 2 and the plurality of ramp loads 3a, for example, as shown in FIG. 6, the connector 5 and the load unit 31 may be connected with the power source line L41 and the ground line L41 as cables, so as to connect all the load units 31 and the connector 5 with cables. Also, in this case, the power source terminal 53a and the ground terminal 54b are provided with not only a tub-like shape, but a pressure-bonding blade, and the power source line L41 and the ground line L41 are pressure-bonded.

Third Embodiment

Figure 7:
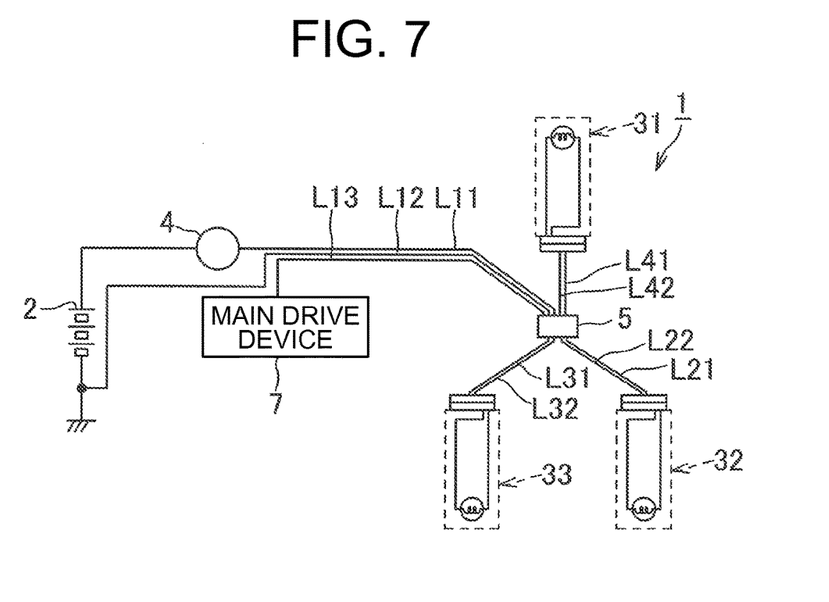
FIG. 7 is a schematic diagram illustrating a third embodiment of the power supply unit of the invention.

Also, when each of the load units 31 to 33 are, for example, arranged as shown in FIG. 7, the connector 5 is arranged in the middle of the load units 31 to 33 as shown in FIG. 7, the connector 5 may be arranged within a range of the power lines L21, L31, L41, and the ground lines L22, L32, L42 being possibly wired, where total cable length of the plurality of power source lines L21, L31, L41, and the ground lines L22, L32, L42 becomes the shortest.

Forth Embodiment

Figure 8:
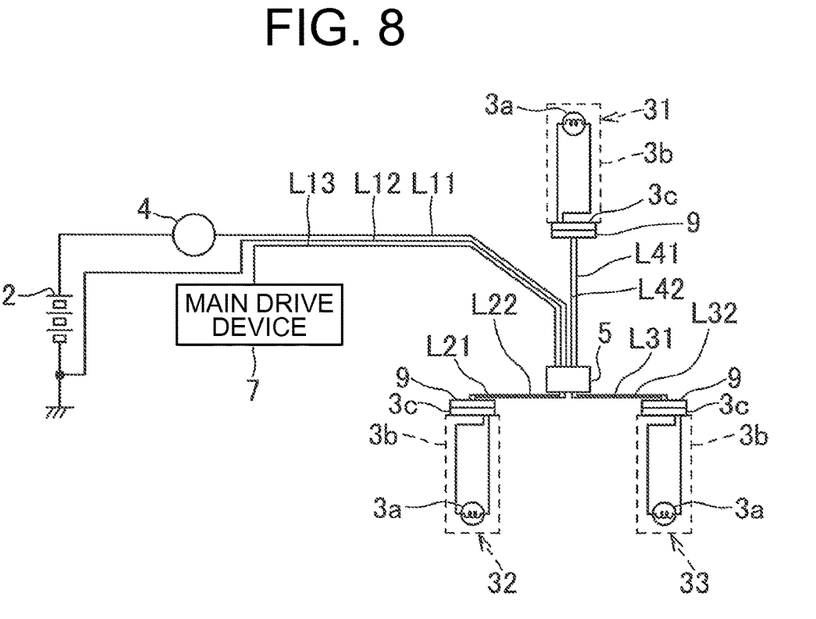
FIG. 8 is a schematic diagram illustrating a forth embodiment of the power supply unit of the invention.

Also, for example, if the ramp load 3a of the load units 32, 33 is 50 W, and the ramp load 3a of the load unit 31 is 25 W, the connector 5 is arranged in the middle of the load units 32 and 33 as shown in FIG. 8, the connector 5 may be arranged within a range of the power lines L21, L31, L41, and the ground lines L22, L32, L42 being possibly wired, where total power loss the plurality of power source lines L21, L31, L41, and the ground lines L22, L32, L42 becomes minimum.

Fifth Embodiment

Figure 9:
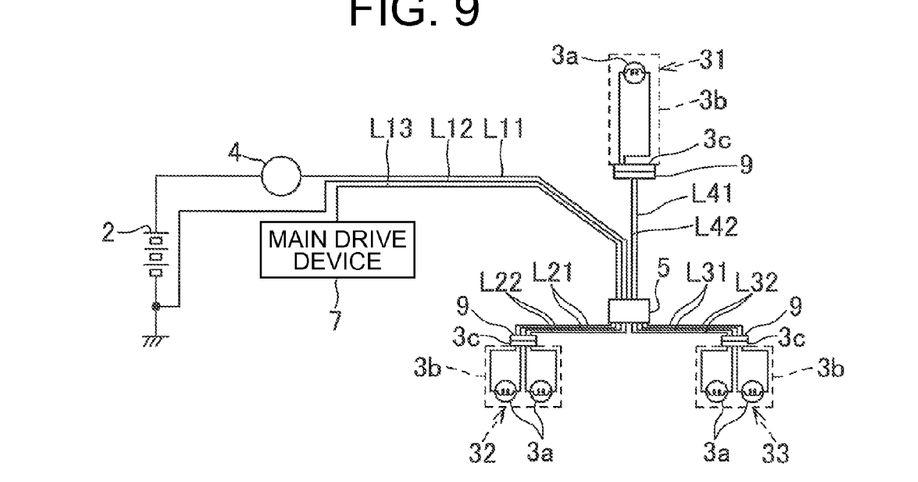
FIG. 9 is a schematic diagram illustrating a fifth embodiment of the power supply unit of the invention.

Also, for example, if the plurality of ramp units 3a is integrated into the load units 32, 33, and the connector 5 and the load units 32, 33 are connected with the plurality of power lines L41, L21, the ground lines L42, L22, the connector 5 is arranged in the middle of the load units 31 and 32 as shown in FIG. 9, the connector 5 may be arranged within a range of the power lines L21, L31, L41, and the ground lines L22, L32, L42 being possibly wired, where total weight of the plurality of power source lines L21, L31, L41, and the ground lines L22, L32, L42 becomes minimum.

Sixth Embodiment

Figure 10:
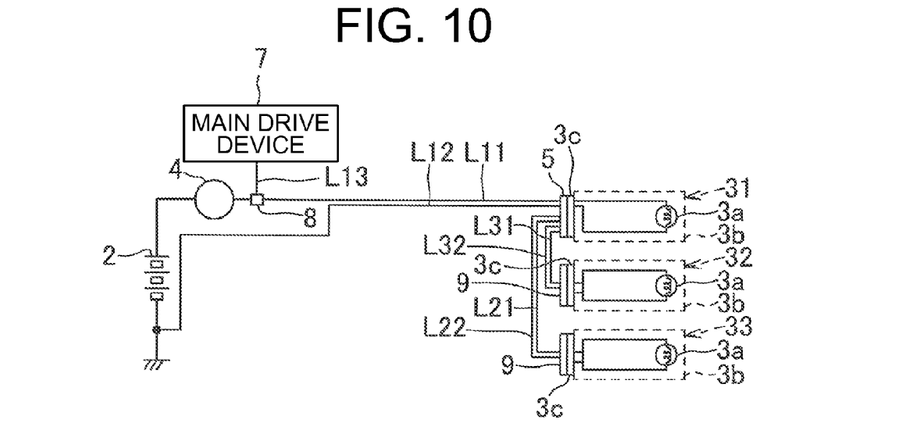
FIG. 10 is a schematic diagram illustrating a sixth embodiment of the power supply unit of the invention.
Figure 11:
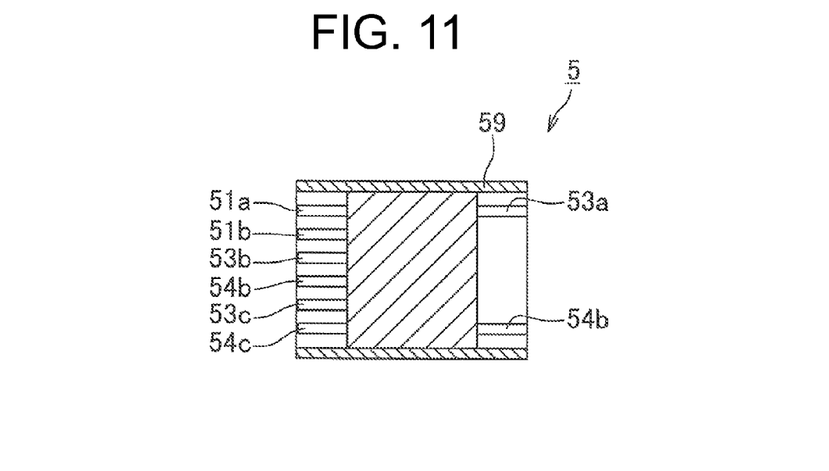
FIG. 11 is a cross-sectional view illustrating a connector shown in FIG. 10.
Figure 12:
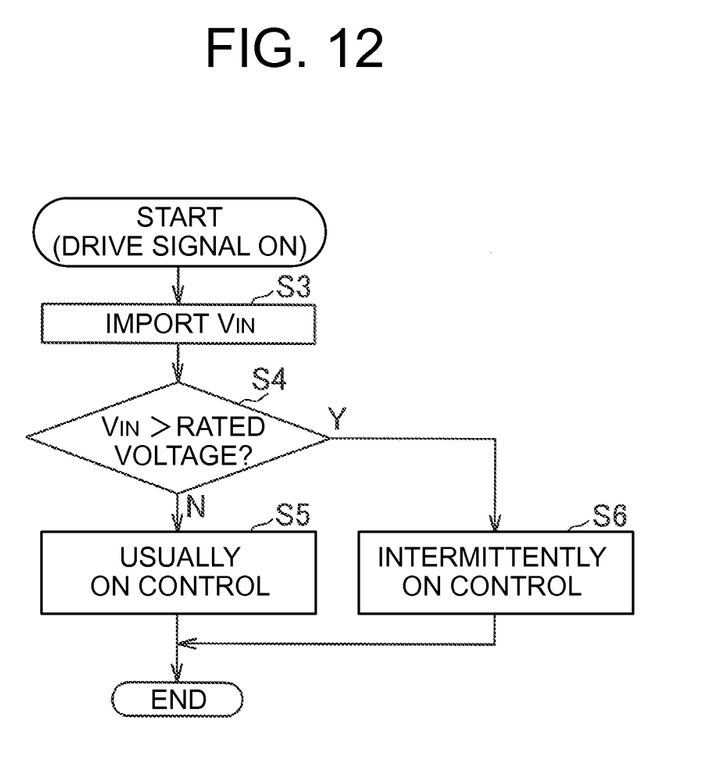
FIG. 12 is a flow chart illustrating a power control device composing the power supply unit shown in FIG. 10.

Then, with reference to FIGS. 10 to 12 a power supply device 1 of a sixth embodiment is discussed. FIG. 10 is the schematic diagram illustrating the sixth embodiment of the power supply unit 1 of the invention. FIG. 11 is the cross-sectional view of the connector 5 shown in FIG. 10. FIG. 12 is the flow chart of the power control device composing the power supply unit 1 shown in FIG. 10.

While the aforementioned first embodiment, on/off drive to the ramp load 3a and duty control in accordance with the input $V_{IN}$ is made by the connector 5, this invention is not limited to this configuration. As shown in FIG. 10 for example, a switch element 8 may be arranged between the battery 2 or the alternator 4 and the connector 5, on/off drive to the ramp load 3a is made by the switch element 8, and the duty control is made by the connector 5.

The aforementioned switch element 8 is, for example, composed of a mechanical relay, or a semiconductor relay, switches on in accordance with the output of the drive signal from the main drive device 7 so as to start supplying power to the voltage detector 56 and the power control device 57 integrated in the ramp load 3a or the connector 5, or block supplying power to the voltage detector 56 and the power control device 57 integrated in the ramp load 3a or the connector 5 in accordance with stop of the output of the drive signal from the main drive device 7.

Furthermore, in the connector 5 the power control device 57 is, differing from the first embodiment, not supplied with the drive signal. Therefore, differing from the first embodiment, the connector 5 is not provide with the pressure-bonding signal terminal 51c for inputting the drive signal as shown in FIG. 11.

Next, an operation of the power supply unit 1 in the second embodiment configured as mentioned above is discussed with reference to the flow chart shown in FIG. 12. Firstly, when the drive signal is inputted from the main drive device 7, the switch element 8 is switched on, power to the voltage detector 56 and the power control device 57 initiates, and the power control device 57 starts its operation.

The power control device 57, While in the first embodiment confirming a state of drive signal in the step S1, instantly goes to steps S3 to S6 without operation in the steps S1 and S2. The steps S3 to S6 were described in the aforementioned first embodiment, of which detailed description is thereby omitted herein.

Note that FIG. 10 illustrates an example to which the first embodiment is applied, but the second to the fifth embodiments can be applied thereto.

Furthermore, according to the aforementioned first to sixth embodiments, the power control device 57 entirely controls the plurality of switch elements 55a to 55c, but the invention is not limited to this configuration. With the drive signal every ramp load 3a from the main drive device 7 outputting, or the rated voltage of the ramp load 3a differing, the plurality of switch elements 55a to 55c may be controlled independently from each other.

According to the first to sixth embodiments, the power control device 57 controls the duty ratio of each of the switch elements 55a to 55c, but the invention is not limited to this configuration. The power control device 57 may usually switch on the switch elements 55a to 55c only when the drive signal is supplied, and may usually switch off the switch elements 55a to 55c when the drive signal is not supplied. The connector 5 integrates therein the switch elements 55a to 55c, the voltage detector 56 and the power control device 57, but the invention is not limited to this configuration. The connector 5 may integrate therein at least the pressure-bonding power source terminal 51a, the first branch circuit 52a, the tub-like power source terminal 53a, but the switch elements 55a to 55c, the voltage detector 56, and the power control device 57 are not indispensable.

Figure 13A:
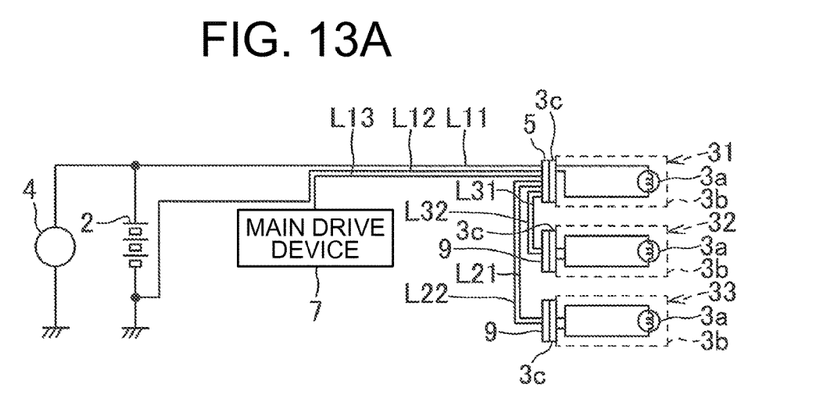
FIG. 13A is a schematic diagram illustrating a power supply unit other embodiment.

Furthermore, in the aforementioned first to sixth the alternator 4 is disposed between embodiments the battery 2 and the ramp load 3a, but the invention is not limited to this configuration. The alternator 4 may be connected to the battery 2 in parallel, but such case can be applied thereto that any ICEV has the power supply unit 1 configured as shown in FIG. 13A.

Furthermore, according to the aforementioned embodiment, the terminals 51a to 51c, 53b, 53c, 54b, and 54c projecting from one side of the connector 5 have pressure-bonding blade formed, the terminals 53a and 54a projecting from the other side have pressure-bonding blade formed into tub-like shape, but forms of the terminal 51a to 51c, 53a to 53c, and 54a to 54c are not limited to this configuration.

Furthermore, in the aforementioned embodiments the load is described taking the ramp load 3a, but the invention is not limited to this configuration. Such load may be driven receiving power supply from the battery, as other motors as well.

Furthermore, in the aforementioned embodiments DC/DC convertor 6 is disposed between the battery 2 and the ramp load 3a, but the invention is not limited to this configuration. The DC/DC convertor 6 may be connected in parallel to the battery 2, which can also be applied to HEV (Hybrid Electric Vehicle) or PHEV (Plug-In Hybrid Electric Vehicle) having power source device 1 mounted therein provided with two batteries 2, 11 and generator 10. BEV (Battery Electric Vehicle) or FCEV (Fuel Cell Electric Vehicle) having the power supply unit 1 mounted therein provided with two batteries 2, 11 as shown in FIG. 13C can also be applied to.

Figure 13B:
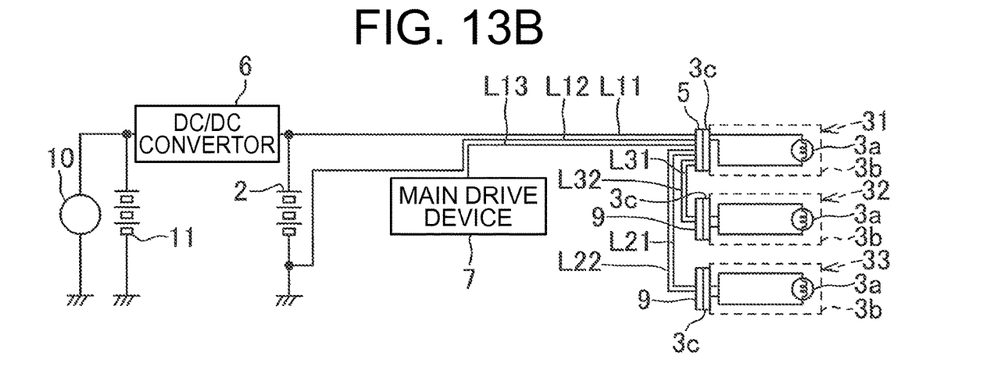
FIG. 13B is a schematic diagram illustrating a power supply unit other embodiment.
Figure 13C:
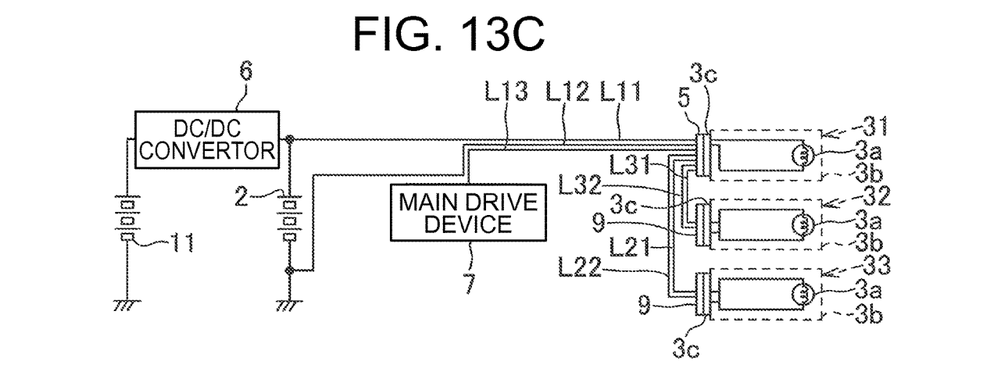
FIG. 13C is a schematic diagram illustrating a power supply unit other embodiment.

Note that FIG. 13 illustrates an example to which the first embodiment is applied, but to which the second to sixth embodiments can be applied.

Furthermore, according to the aforementioned embodiment, the first branch circuit 52*a* is integrated into the connector 5, but the invention is not limited to this configuration. The connector 5 may not be integrated thereinto.

Furthermore, the aforementioned embodiments only show typical configuration of the invention, the invention should not be limited to the embodiments. Namely, unless otherwise such changes and modifications depart from the scope of the present invention hereafter defined, they should be construed as being included therein.

REFERENCE SIGNS LIST

1 power supply unit
2 battery (power source)
3*a* ramp load (load)
3*b* holder (case)
5 connector
51*a* pressure-bonding power source terminal (first terminal fitting)
52*a* first branch circuit (branch circuit)
53*a* tub-like power source terminal (second terminal fitting)
53*c* pressure-bonding power source terminal (second terminal fitting)
55*a* switch element
55*b* switch element
55*c* switch
56 voltage detector (voltage detecting means)
57 power control device
59 housing
L21 power source line (cable)
L31 power source line (cable)
L41 power source line (cable)

The invention claimed is:

1. A power supply unit including a power source and a plurality of loads receiving power from the power source, the power supply unit comprising:

a branching circuit branching one power line connected to the power source into a plurality of branch lines for providing the plurality of loads with power source line, the branching circuit being located adjacent to the loads; and a connector including a connector housing, a first terminal fitting , and a plurality of second terminal fittings, the first terminal fitting being connected to the power source, the plurality of second terminal fittings being connected to the loads, the branching circuit being housed in the connector housing, in connection with the first terminal fitting and the second terminal fittings, wherein the connector housing further houses a plurality of switching elements each disposed on the branch lines, a voltage detector detecting a supply voltage supplied to each of the loads inputted from the first terminal fitting, and an on/off controller intermittently switching on the switch elements and decreasing a duty ratio of an on-period of the switching elements as the supply voltage detected by the voltage detector rises.

2. The power supply unit as claimed in claim 1, wherein the branching circuit is attached to a case housing at least one of the plurality of loads.

3. The power supply unit as claimed in claim 1, wherein the branching circuit is located nearer to the plurality of loads than a middle among the power source and the plurality of loads.

4. The power supply unit as claimed in claim 1, further comprising a plurality of cables connecting the branching circuit and the plurality of loads, wherein the branching circuit is located where a total cable length of the plurality of cables becomes minimum within a range of possibly wiring the cables.

5. The power supply unit as claimed in claim 1, further comprising a plurality of cables connecting the branching circuit and the plurality of loads, wherein the branching circuit is located where a total power loss of the plurality of cables becomes minimum within a range of possibly wiring the cables.

6. The power supply unit as claimed in claim 1, further comprising a plurality of cables connecting the branching circuit and the plurality of loads, wherein the branching circuit is located where a total cable weight of the plurality of cables becomes minimum within a range of possibly wiring the cables.

* * * * *